United States Patent Office 2,819,261
Patented Jan. 7, 1958

2,819,261

PROCESS FOR PREPARING OXYALKYLATED DERIVATIVES

Louis T. Monson, Puente, and Woodrow J. Dickson, Monterey Park, Calif., assignors to Petrolite Corporation, Los Angeles, Calif., a corporation of Delaware No Drawing. Application June 4, 1953
Serial No. 359,661

1 Claim. (Cl. 260—209.5)

This invention relates to the preparation of substantially anhydrous and substantially undiluted oxyalkylated derivatives of a particular class of oxyalkylation-susceptible organic compounds which, because of certain characteristics they possess, are not otherwise oxyalkylatable to produce such derivatives.

Oxyalkylation-susceptible organic compounds are characterized by their possession of labile hydrogen atoms, i. e., hydrogen atoms attached to oxygen, nitrogen, or sulfur. Their oxyalkylation may proceed with greater or lesser readiness; but oxyalkylated derivatives can be prepared from them.

The oxyalkylating agents conventionally employed to produce oxyalkylated derivatives are the lower alkylene oxides, ethylene oxide, propylene oxide, butylene oxide, glycid, and methylglycid. These may be defined as alpha-beta alkylene oxides containing four carbon atoms or less. They may be employed singly, in sequence, or in admixture.

Unfortunately, there are some situations, like those with which this invention is concerned, in which the employment of such conventional oxyalkylating agents is not practicable. Some starting materials, although inherently oxyalkylation-susceptible, are solids which are substantially insoluble in any of the oxyalkylation-resistant solvents available for use in the preparation of oxyalkylated derivatives.

For example, many oxyalkylation-susceptible solids are insoluble in xylene, which is a frequently used solvent in oxyalkylation procedures. Xylene is oxyalkylation-resistant and is readily separable from the oxyalkylation mass by simple distillation.

Furthermore, even though such starting materials may be soluble in a few unusual oxyalkylation-resistant solvents, the latter are themselves comparatively non-volatile. Various ethers might in some cases be considered suitable solvents for the oxyalkylation-susceptible solid starting material. Such ethers, like the diethers of the polyglycols, in addition to being expensive, are not susceptible to easy separation from the oxyalkylation mass by distillation. Hence, they are not readily recoverable from the oxyalkylation mass by distillation, to leave an undiluted oxyalkylated derivative.

Some solids which are oxyalkylation-susceptible are in fact most soluble in water; but water is not an acceptable solvent for use in oxyalkylation processes employing the conventionally used alkylene oxides because it reacts with such alkylene oxides to produce polyglycols, during oxyalkylation.

We are aware that it has been proposed in the past to conduct oxyalkylations using the conventional alkylene oxides in aqueous solutions, presumably on the assumption that the oxide did not react with the water. However, it is now established that such reaction with the water occurs to some extent. The oxyalkylated mass produced in such aqueous systems therefore contains varying proportions of alkylene glycols as contaminants or adulterants. Our process avoids this difficulty because it is conducted under substantially anhydrous conditions in all cases. The starting solid material, the catalyst, and the alkylene carbonates are all employed by us in substantially anhydrous form.

Furthermore, many oxyalkylation-susceptible solids cannot be used in undiluted form in an oxyalkylation process using the alkylene oxides, and simply liquefied by heating prior to introduction of the oxyalkylating agent, because they undergo partial decomposition as they melt. If maintained at the temperature at which fusion just begins to be apparent, for a time such as 15 minutes, they undergo at least partial decomposition. If they exhibit such behavior in the presence of an oxyalkylation catalyst, like the alkali carbonates, they come within our class of suitable starting materials for use in our present process.

The foregoing statement of difficulties is applicable to greater or lesser extent to a number of oxyalkylation-susceptible compounds, including a pectin. The alkylene oxides are not usable for their oxyalkylation for the above stated reasons.

Our present invention overcomes such difficulties and permits oxyalkylation of such materials to be accomplished by simple and inexpensive means. Thus, we employ as primary oxyalkylating agents the carbonates which are the counterparts of the foregoing alkylene oxides, viz., ethylene carbonate, propylene carbonate, butylene carbonate, hydroxypropylene carbonate, and hydroxybutylene carbonate. Of these, only ethylene carbonate and propylene carbonate are currently in commercial production, although the others will doubtless achieve similar commercial status in time.

More specifically, our invention relates to a two-step process for preparing substantially anhydrous, substantially undiluted oxyalkylated derivatives from pectin which process consists in: (A) first reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst; the proportion of alkylene carbonate employed being sufficient to yield a product which is at least liquefiable at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one member selected from the aforesaid class of alkylene oxides.

Briefly described, our process is practiced by introducing into a suitable processing vessel the solid, oxyalkylation-susceptible starting material, preferably in finely divided form; the desired or required proportion of alkylene carbonate; and a minor proportion of an alkaline catalyst such as an alkali carbonate. The mixture is warmed, preferably with stirring. As the temperature reaches a certain critical level, usually somewhat above 100° C., there is a vigorous effervescence in which carbon dioxide is liberated, and the oxyalkylated derivative is formed. In such instances where the starting material is acidic, it is used at least partially in the form of a salt, e. g., an alkali salt such as may be produced in situ by adding enough alkaline catalyst to leave a slight excess over what is required to leave the mixture slightly alkaline.

It is sometimes desirable to modify this general procedure in various minor ways. For example, the alkylene carbonate is introduced into a vessel and warmed until liquid. The catalyst is added. The solid, oxyalkylation-susceptible material is then slowly introduced in finely divided form, with stirring, and the temperature is slowly raised to the reaction point. Such procedural variation is useful where the oxyalkylation-susceptibility of the starting material is not great and where use of the first-described procedure above would produced a solid mass in the vessel which could not be readily handled thereafter.

In our process, we usually employ only enough alkylene carbonate in the first step to produce a liquid or readily liquefiable derivative, which contains a relatively small proportion of oxyalkylene radicals. We then continue oxyalkylation using the conventional alkylene oxides. Stated another way, this two-step process is employed to produce, first, intermediates; then more highly oxyalkylated products are prepared in the second step using the more economical, conventional alkylene oxides.

In the appended claims, we have specified that the intermediate product prepared in the first step of the two-step process shall be a liquid or at least liquefiable at the temperature required to effect the oxyalkylation by use of the alkylene oxides in the second step of our process. Said second step is conducted at conventional oxyalkylation temperatures, usually between about 100° C. and 200° C.

One incidental advantage of using the alkylene carbonates for oxyalkylation is that they are relatively inert materials as compared with the alkylene oxides. Their use therefore entails smaller hazards. Oxyalkylations using them are conducted with greater safety than if the alkylene oxides were employed. Processing vessels are usually not required to be pressure-resistant when the alkylene carbonates are employed, whereas ethylene oxide and propylene oxide, for example, are required to be employed in pressure vessels because of their physical properties.

As is true of all generally applicable processes, we have found that all oxyalkylation-susceptible starting materials of the defined class do not react with equal readiness with the alkylene carbonates in our process. Where the starting material, although presumably oxyalkylation-susceptible as judged by its structure, is of very high molecular weight, or where steric or other obscure influences are adverse, oxyalkylation may proceed at extremely slow rates. However, if the starting material is oxyalkylation-susceptible, its oxyalkylation may be accomplished in due time by means of the alkylene carbonates mentioned above.

The temperature at which the oxyalkylation reaction will occur, using the alkylene carbonates, must be expected to vary somewhat with the choice of starting material. In all cases, the proper technique to be initially employed is to advance the temperature cautiously and so to determine the minimum temperature required to effect reaction. This procedure requires no especial skill and no experimentation, in that the vigorous effervescence resulting from the liberation of carbon dioxide in the reaction is ready evidence of such reaction. As stated above, the reaction usually requires a temperature somewhat above 100° C. The maximum feasible oxyalkylation temperature is of course the decomposition temperature for the mixture of solid starting material, catalyst, and alkylene carbonate, and above which temperature pyrolysis of the starting material, polymerization of the alkylene carbonate, or other undesired reaction begins to occur.

The oxyalkylation catalysts employed by us are usually the alkali carbonates such as sodium or potassium carbonate, in substantially anhydrous form. Where the starting material is acidic, at least sufficient alkali carbonate should be added to neutralize such acidity. Thereafter an additional amount of alkali carbonate is usually desirably included to accelerate the oxyalkylation process. However, in some instances the alkali-neutralized starting material is sufficiently alkaline to supply the desired catalytic influence, without addition of further amounts of alkali carbonate.

The finished oxyalkylated product will of course contain such inorganic catalyst. The catalyst will usually separate readily from the oxyalkylated mass on standing, especially if slightly warm. Since the residual proportions of catalyst in the supernatant product are usually of very small magnitude after such settling, we consider they do not materially dilute or contaminate our finished products.

In some instances, solid, oxyalkylation-susceptible substances, which may have been stated in the literature to have definite melting points, are nevertheless susceptible to progressive decomposition if maintained at or about the temperature at which they begin to fuse, for any period of time. Some such substances similarly undergo progressive deterioration if subjected to such temperatures in the presence of an alkaline material, like an oxyalkylation catalyst, for any period of time. Such substances which, although they may have recorded definite melting points, are unstable under oxyalkylating conditions as described, are included among our usable starting materials.

We have therefore limited our usable starting materials to those which are either (1) infusible or which (2) suffer at least partial decomposition if maintained at their beginning-of-fusion temperature for a period of at least 15 minutes in the presence of an oxyalkylation catalyst. Additionally, such solid starting material must be insoluble in oxyalkylation-resistant, distillation-separable solvents, as already stated.

As the molecular weight of the oxyalkylation-susceptible starting material rises, its reactivity with alkylene carbonates is generally reduced. Since, for example, ethylene carbonate is more reactive than propylene carbonate, and propylene carbonate is more reactive than butylene carbonate, there may be marked differences in the speed of oxyalkylation of such high-molecular-weight starting materials when different alkylene carbonates are used. In marginal cases, it will be understood, a material may be oxyalkylation-susceptible in the sense that it is reactive toward ethylene carbonate, but oxyalkylation-inert, in that it is insensitive toward, for example, propylene carbonate or butylene carbonate.

Our process may be practiced using more than one alkylene carbonate, and be in addition, more than one alkylene oxide, to produce mixed oxyalkylated derivatives. In such cases, the alkylene carbonates may be employed in sequence or they may be employed as a mixture, as desired. The same is true of the alkylene oxides employed in our two-step process, which may be used in sequence or as a mixture.

As examples of our process, in which the foregoing starting materials are usable, the following are typical but not exclusive.

In all cases, the apparatus employed to produce the products in the laboratory was a conventional resin pot assembly, fitted with a stirrer. This is a glass apparatus comprising a lower bowl or vessel, and an upper cap section containing several outlets, for the stirrer shaft, a thermometer, and a reflux condenser, and a charge hole fitted with a stopper. The design is conventional and need not be described further. Heat is supplied by a glass-textile heating mantle which fits the lower portion of the assembly, and which is regulated by inclusion of a rheostat in the electrical circuit. Such devices are likewise wholly conventional, and require no description here. Motor-driven stirrers, of the kind here used, and having stainless-steel or glass shafts and paddles, are likewise conventional laboratory equipment.

*Example 1*

Heat 40 grams of m-digallic acid (tannic acid) with 264 grams of ethylene carbonate and 5 grams of powdered sodium carbonate, in a conventional laboratory resin pot assembly, stirring the mixture, and increasing the temperature slowly over a period of about 2 hours, until a vigorous effervescence occurs, at about 165° C. The catalyst settles to bottom, on standing. The supernatant product is a viscous, dark liquid.

Example 2

Heat 40 grams of commercial quebracho extract with 264 grams of ethylene carbonate and 5 grams of powdered sodium carbonate, in a conventional laboratory resin pot assembly, stirring the mixture, and increasing the temperature slowly over a period of about 1.3 hours, to about 185° C., where effervescence occurs. After the catalyst settles from the mass, on standing, the supernatant material is a viscous, dark liquid.

Example 3

We have repeated Examples 1 and 2, but substituting 306 grams of propylene carbonate for the 264 grams of ethylene carbonate previously used. Effervescence occurs as before, as the temperature is increased slowly to about 175–195° C. The products are dark, viscous liquids.

Example 4

Repeat Examples 1 and 2 but substitute 348 grams of butylene carbonate for the 264 grams of ethylene carbonate used in those examples. The products are viscous, dark-colored liquids.

Example 5

Repeat Examples 1 and 2 but substitute 354 grams of hydroxypropylene carbonate for the 264 grams of ethylene carbonate used previously. The products are dark, viscous liquids.

Example 6

Repeat Examples 1 and 2 but substitute 396 grams of hydroxybutylene carbonate for the 264 grams of ethylene carbonate used previously. The products are dark, viscous liquids.

Example 7

Remove the reaction mass of Example 2 from the resin pot assembly in which it was prepared, and transfer to a conventional oxyalkylating autoclave. Raise the temperature to between 125° and 170° C. and slowly introduce, with stirring, 132 grams of ethylene oxide, keeping the pressure below about 50 p. s. i. The product is a dark liquid.

Example 8

We have repeated Example 7, but instead of employing 132 grams of ethylene oxide in the second step of the procedure we have substituted 176 grams of propylene oxide. The product was a dark, viscous liquid.

Example 9

Heat 40 grams of commercial quebracho extract with a mixture of 132 grams of ethylene carbonate and 153 grams of propylene carbonate and 10 grams of powdered sodium carbonate, in a conventional laboratory resin pot assembly, stirring the mixture, and increasing the temperature slowly over a period of about 2 hours, until effervescence occurs, at about 185° C. The product is a dark, viscous liquid.

Example 10

Transfer the whole reaction mass of Example 9 to a conventional oxyalkylating autoclave. Raise the temperature to between 125° and 170° C. and slowly introduce, with stirring, a mixture of 66 grams of ethylene oxide and 87 grams of propylene oxide, keeping the pressure below about 50 p. s. i. The product is a dark, viscous liquid.

Example 11

Add 90 grams of powdered commercial pectin slowly to 528 grams of ethylene carbonate and 15 grams of powdered sodium carbonate, in a conventional laboratory resin pot assembly, with stirring, raising the temperature to about 195° C. over a period of about 1.5 hours. Effervescence occurs. The product is a very viscous, clear, dark liquid, from which some 60 grams of solids separate on standing.

Example 12

We have repeated Example 11 but using 30 grams of pectin, 528 grams of ethylene carbonate, and 15 grams of powdered sodium carbonate. The product is a clear, dark, viscous liquid, from which practically no solids separated on standing.

Example 13

Melt 528 grams of ethylene carbonate in the presence of 10 grams of powdered sodium carbonate, in a conventional glass resin pot assembly. Start the stirrer, raise the temperature slowly to about 175° C. and introduce in small increments a total of 31 grams of a finely-powdered commercial infusible Bakelite resin (prepared from phenol and formaldehyde), continuing the stirring over a period of 10 hours. During this time, effervescence occurs, and a homogeneous mass is slowly produced. The finished product is a very viscous dark liquid.

Example 14

Heat 42 grams of 3,4-pyridin-dicarboxylic acid (cinchomeronic acid) with 176 grams of ethylene carbonate and 20 grams of powdered sodium carbonate in a conventional resin pot assembly, with stirring, raising the temperature to about 180° C. over a period of about an hour. Effervescence occurs, with formation of a liquid product.

Example 15

We have repeated Example 14, but substituting for the pyridin-dicarboxylic acid 55 grams of p-aminophenol, and using 176 grams of ethylene carbonate and 20 grams of sodium carbonate as before. The product is liquid.

Example 16

We have repeated Example 14, but substituting for the pyridin-dicarboxylic acid 77 grams of 4-aminosalicylic acid, and using 176 grams of ethylene carbonate, and 10 grams of sodium carbonate. The product is liquid.

Example 17

We have repeated Example 14, but substituting for the pyridin-dicarboxylic acid 58 grams of 5-butylurea, and using 176 grams of ethylene carbonate and 10 grams of sodium carbonate. The product is liquid.

Example 18

We have repeated Example 14, but substituting for the pyridin-dicarboxylic acid 98 grams of 1-aminoglucose, and using 528 grams of ethyl carbonate and 10 grams of sodium carbonate. The product is liquid.

Example 19

We have repeated Example 14, but substituting 187 grams of diglucosylimine for the pyridin-dicarboxylic acid there employed, and employing 528 grams of ethylene carbonate and 15 grams of sodium carbonate. The product is liquid.

Example 20

We have repeated Example 14, but substituting for the pyridin-dicarboxylic acid 43 grams of N-stearylglucosamine, prepared by reaction of stearylamine and glucose, and employing 264 grams of ethylene carbonate and 10 grams of powdered sodium carbonate. The product liquefies when heated to about 120° C.

Example 21

Melt 264 grams of ethylene carbonate in the presence of 6 grams of powdered potassium carbonate, in a resin pot assembly. Add slowly, with stirring, a total of 25 grams of a granular commercial anion-exchange resin of the amine type (Amberlite IRA–400), raising the temperature gradually to about 170° C. Continue heating and stirring for a total of about 24 hours. Gas is evolved. The product is a viscous brown liquid.

Example 22

Melt 528 grams of ethylene carbonate in the presence of 6 grams of powdered sodium carbonate, in a resin pot assembly. Add slowly, with stirring, a total of 25 grams of a granular commercial cation-exchange resin of the sulfonic acid type (Amberlite IR-120), raising the temperature gradually to about 185° C. Continue heating and stirring for a total of about 28 hours. Considerable gas is evolved. The product is a black liquid.

Example 23

Heat with stirring, in a resin pot assembly, 46 grams of saccharin, 264 grams of ethylene carbonate, and 5 grams of powdered sodium carbonate, to about 185° C., and continue stirring at that temperature for about 3 hours. Effervescence occurs, and a dark liquid is produced.

Example 24

We have repeated Example 23, but substituting for the saccharin 30 grams of cysteine. A dark liquid product resulted.

Example 25

We have repeated Example 23, but substituting for the saccharin 60 grams of l-cystine. A dark liquid product resulted.

Example 26

Melt 264 grams of ethylene carbonate in the presence of 6 grams of powdered sodium carbonate, in a resin pot assembly. Add slowly, with stirring, a total of 25 grams of a powdered commercial phenylsulfonamide-formaldehyde resin, raising the temperature gradually to about 185° C. Continue heating and stirring for a total of about 24 hours. Gas is evolved. A liquid product is formed.

The products of our processes find a number of varied uses, as would be surmised from the variety of compounds embraced within our class of starting materials. They are generally surface-active, and hence are usable where low-surface-tension solutions are useful, as in wetting, dispersing, and emulsifying operations. They are sometimes useful in demulsifying processes, in which oil and water are separated from their emulsions, and particularly crude oil and oil-field waters. They are useful in biochemical and biological work in some cases.

In all cases the practice with respect to the above-recited examples was to advance the temperature cautiously until effervescence and evolution of carbon dioxide become apparent. It should be noted that in all cases the reactions of the examples were thereafter continued until the foam produced had substantially subsided. No single time of reaction can be employed, in view of the diversity of the starting materials and the variability in their reactivity.

We claim:

A two-step process for preparing substantially anhydrous, substantially undiluted oxyalkylated derivatives from a pectin which process consists in: (A) first reacting said solid with at least one member selected from the class consisting of ethylene carbonate, propylene carbonate, butylene carbonate, hydroxypropylene carbonate, and hydroxybutylene carbonate, in the presence of an alkaline oxyalkylation catalyst; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one member selected from the aforesaid class of alkylene oxides.

References Cited in the file of this patent

UNITED STATES PATENTS

| | | |
|---|---|---|
| 2,040,212 | Orthner | May 12, 1936 |
| 2,060,410 | Balle | Nov. 10, 1936 |
| 2,448,767 | Carlson | Sept. 7, 1948 |
| 2,481,768 | Mills | Sept. 13, 1949 |

OTHER REFERENCES

Pigman: "Chemistry of the Carbohydrates," published by Academic Press (N. Y.), 1948 (pp. 556-7 relied on).